Nov. 2, 1965  H. G. NEIL  3,215,843
PHOTOSENSITIVE LIGHT SOURCE INTENSITY CONTROL SYSTEM
Filed June 2, 1961
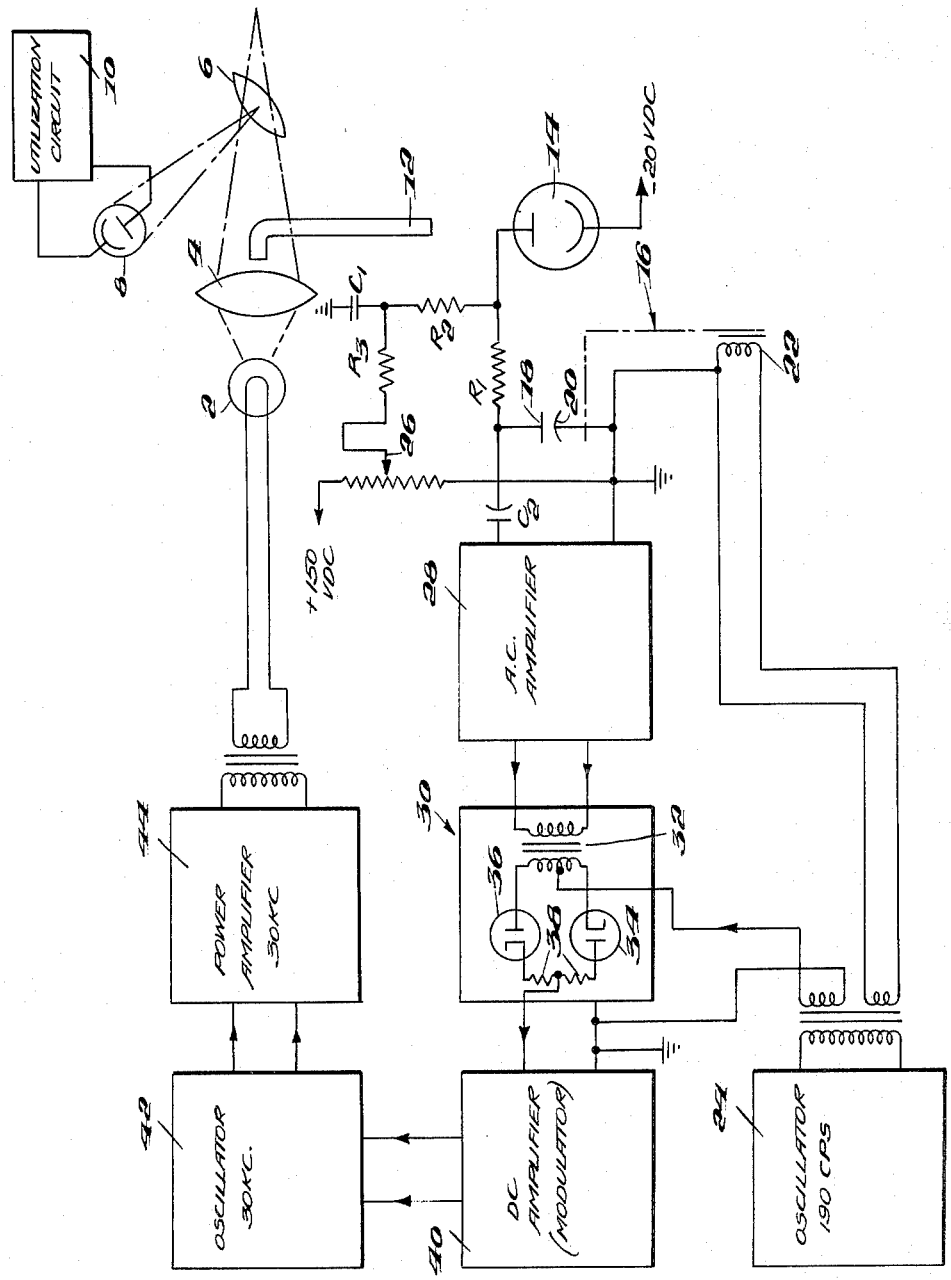
INVENTOR
HUGH G. NEIL,
BY
ATTORNEYS United States Patent Office 3,215,843
Patented Nov. 2, 1965

3,215,843
PHOTOSENSITIVE LIGHT SOURCE INTENSITY
CONTROL SYSTEM
Hugh G. Neil, Knoxville, Tenn., assignor to Special Instruments Laboratory, Inc., Knoxville, Tenn., a corporation of Tennessee
Filed June 2, 1961, Ser. No. 114,344
4 Claims. (Cl. 250—205)

This invention relates to a light control system and, more particularly, to a system for automatically stabilizing the intensity of a light source in an optical measuring or control system.

A light source stabilizing system is an important part of optical measuring and testing instruments. These optical instruments may be adapted to perform quality control functions. In a typical quality control system, a light source is mounted to shine on the specimen which is to be evaluated. Reflected light from the specimen shines on a phototube, generating a current through the tube which is proportional to the intensity of the light received by the tube. This current is then fed to a utilization circuit which measures some optical quality of the specimen. Subsequent devices in the utilization circuit may perform operations in response to the signal from the phototube. For example, an optical measuring instrument may be set up to inspect articles on a production line and a utilization circuit may be used to reject defective articles.

The accuracy of the readings by the phototube circuit of the measuring instrument is dependent upon a constant intensity source of light. The intensity of the light source may be affected by changes in the voltage supply to the lamp, normal erosion of the lamp filament, or dust on the lens of the light source. If the intensity of the light changes, the intensity of light reaching the phototube circuit also changes, thereby introducing error into the measurements.

Various attempts have been made to control the intensity of the light source by a monitor phototube or other device which modifies the intensity of light from the light source. In a typical intensity control circuit, the current generated by the monitor phototube is applied to the voltage supply of the light source to maintain a constant intensity by increasing or decreasing the voltage applied to the lamp. As the meter and utilization circuits have become more sensitive and more accurate, the monitor circuits heretofore proposed have not been capable of maintaining the intensity of a light source sufficiently constant.

One source of error in phototube lamp intensity regulators is the pickup by a sensitive monitor circuit of stray signals from the utilization circuit. Even if the monitor circuit and utilization circuit are physically separate from each other, there may be enough 60-cycle pickup within the monitor circuit to introduce error into the corrective signal to the voltage supply of the light source.

Accordingly, it is an object of this invention to provide an improved light intensity regulator which does not pick up stray signals.

It is another object of this invention to provide an improved light intensity regulator which has a high sensitivity.

It is a further object of this invention to provide a light intensity regulator which has a rapid response.

In accordance with a preferred embodiment of the invention, a radio frequency oscillator and power amplifier supply high frequency current to an incandescent lamp. A portion of the light rays from the lamp impinge on a phototube and generate a current in the tube which is proportional to the intensity of the light. The phototube is connected to a balancing circuit in which one of the elements is an electrostatic alternator device. The electrostatic alternator or "capacitive chopper," as it is sometimes called, is driven by a constant frequency oscillator at a frequency other than 60 c.p.s. or multiples thereof. The resistance of the balance circuit can be adjusted so that at the desired light intensity, there will be no voltage difference across the plates of the chopper. If the intensity of the light source drops below the reference intensity, the current generated by the phototube will decrease and a charge will appear on the plates of the chopper and, since the chopper is oscillating at a constant frequency, an A.C. signal will be generated. If the intensity of the light on the phototube increases above the reference intensity, a charge will appear on the chopper plates, but the polarity of the charge on the plates will be opposite from that which occurs when the light intensity decreases. Accordingly, the A.C. signal generated by the chopper when the light intensity is increased is 180° out of phase with the signal generated when the light intensity is decreased from the reference value.

The output signal from the chopper is amplified by an A.C. amplifier and fed to a phase detector. The constant frequency oscillator which drives the chopper is also connected to the phase detector. The phase detector determines the polarity of the charge on the plates of the chopper and feeds a corresponding signal through a D.C. amplifier to the oscillator of the lamp circuit. In response to the signal from the phase detector, the oscillator increases or decreases the voltage to the power amplifier to cause a corresponding increase or decrease of the intensity of the lamp. When the intensity of the lamp returns to the reference intensity, there will be no charges on the plates of the chopper and accordingly, the corrective signal will cease.

The drawing is a block diagram showing the components of a lamp intensity regulating circuit and a utilization circuit for an optical measuring system.

A preferred form of the invention is shown in the drawing, in which an incandescent lamp 2 is mounted so that rays of light from the lamp pass through a lens 4 and fall on a specimen 6. A portion of the light is reflected by the specimen 6 and falls on a phototube 8, or other light sensitive device. The output from the phototube 8 is supplied to a utilization circuit 10 which operates in response to the intensity of light falling on the phototube 8.

One type of utilization circuit which might be used with this system is a light reflectance meter. The meter would indicate on a dial the relative reflectance of a specimen 6. The output of the phototube 8 is converted to an A.C. signal which is proportional to the current generated in the phototube. This conversion may be accomplished by means of an electrostatic chopper or other device. The A.C. signal from the phototube is then amplified and fed to a two-phase servo motor. If the signal from the phototube is in phase with the line voltage, the shaft of the motor will rotate in one direction and if it is out of phase, the shaft will rotate in the opposite direction. The shaft of the servo motor is mechanically connected to the arm of a variable potentiometer in the phototube circuit. Rotation of the servo motor causes a change in the voltage output of the potentiometer to balance the voltage generated in the phototube. When a balance is achieved, there is no A.C. signal from the phototube circuit and, consequently, the servo motor will stop. The potentiometer is calibrated so that the position of the arm will indicate the relative reflectance of the specimen 6.

Light is also directed from the lamp 2 by a light pipe 12 or other means to fall on a monitor phototube 14 which generates a current that is proportional to the intensity of the light falling on it. The phototube 14 is connected to an electrostatic chopper 16. The fixed plate 18 of the chopper is connected through a resistance $R_1$ to the plate of the phototube 14. The movable plate 20 is connected to ground. The movable plate 20 is caused to move relative to the fixed plate 18 by an electromagnetic device 22. An oscillator 24 drives the electromagnetic device 22 at a constant frequency preferably other than 60 c.p.s. or multiples thereof, inducing an oscillation of the movable plate 20 at the oscillator frequency. The oscillation of the movable plate 20 causes a sinusoidal variation in the capacitance between the plates 18 and 20 and, accordingly, generates an A.C. signal at the same frequency as the oscillator frequency.

A load circuit is also connected to the plate of the phototube 14. The load circuit contains a resistor $R_2$, a filter condenser $C_1$ and a main load resistor $R_3$. A D.C. voltage, preferably +150 volts, is applied through the variable potentiometer 26 to the load circuit.

Although any values of resistance or capacitance for the components of the phototube circuit which will permit a balance between the current in the branches of the phototube circuit may be used, optimum results have been achieved with a 44-megohm resistor for $R_1$, a 220K-ohm resistor for $R_2$, a 22-megohm resistor for $R_3$, a 20K-ohm resistor for potentiometer 26 and a .01-microfarad condenser for $C_1$. These values in the load circuit provide an anticipatory signal when the intensity of light on the phototube 14 begins to change. If the capacitor $C_1$ were not in the circuit, it would oscillate at a relatively high frequency, about ten cycles per second. Without the 220K-ohm resistor $R_2$ the circuit would oscillate at a low frequency, about a half cycle per second. By using a combination of the two, they are complementary, and when the system starts to change, there is a signal of about 1 percent through the 220K-ohm resistor $R_2$ which will anticipate the final output signal. Since the high frequency gain is cut down by a factor of 100 and the low frequency gain is enhanced, the total loop gain system can be operated at a much higher level. A high loop gain enables the system to maintain a much more constant light intensity since it has a high rate of response.

The oscillator 24 is preferably operated to supply an output of 190 cycles per second. Any reasonable frequency could be used, but a signal of 60 c.p.s. or multiples of 60 c.p.s. should not be used if associated equipment such as components of the monitor circuit or the utilization circuit are operated at 60 c.p.s. The fixed plate 18 of the chopper 16 is connected to an A.C. amplifier 28 through a capacitor $C_2$, preferably of 100 microfarads. The amplifier 28 preferably operates on a narrow band width; between 100 and 300 cycles per second if the input signal is 190 c.p.s. The amplifier 28 amplifies the charge on the plates 18 and 20 of the chopper 16 and, since the movable plate 20 oscillates at 190 cycles per second, the amplifier output signal frequency will also be 190 cycles per second.

The output signal from the amplifier 28 is fed to a phase detector 30. The phase detector determines the phase of the signal from the amplifier with reference to the phase of the signal from the oscillator 24. One type of phase detector is shown in the drawing. A transformer 32 is connected across the output of the A.C. amplifier 28. A center tap of the secondary of the transformer is connected to the oscillator 24 and half of the secondary is connected to the cathode of a tube 34 and the other half is connected to the anode of a tube 36. The anode and cathode, respectively, of each tube is connected through a balanced resistor 38 to a D.C. amplifier 40.

The AC output of the phase detector is filtered in the D.C. amplifier 40 and supplied to an oscillator 42 as a D.C. signal. The oscillator 42 is a high frequency oscillator operating preferably at 30 kc. The D.C. signal from the D.C. amplifier 40 modulates the output of the oscillator 42 in accordance with the signal from the phase detector 30 to increase or decrease the power output of the oscillator. A power amplifier 44 amplifies the signal from the oscillator 42 to provide power for the lamp 2.

The lamp 2 has an incandescent filament. The filament responds at a slow rate to changes in filament current. The power supply for the lamp oscillates at a high frequency and since the filament cannot follow the frequency it will operate at an average intensity. The result is that the lamp has the characteristics of a D.C. light source.

In operation, the potentiometer 26 is adjusted in relation to the desired intensity of the lamp 2. If the intensity of light on the phototube 14 decreases, a charge will appear on the plates of the chopper 16 and an A.C. signal will be generated. If the intensity of the lamp 2 is equal to the reference intensity, there will be no charge on the plates 18 and 20 and, consequently, no signal is applied to the amplifier. If the intensity of the lamp 2 increases, however, a charge will appear on the plates 18 and 20, but of the opposite polarity than in the case where the intensity is lower than the reference. The signal from the chopper which indicates an increase in intensity will, therefore, be 180 degrees out of phase with a signal which indicates a decrease in intensity. This A.C. signal from the chopper is fed to the amplifier 28 through a capacitor $C_2$. The phase detector 30, using the phase of the signal from the oscillator 24, determines whether the signal from the amplifier 28 is in phase or out of phase with the signal from the oscillator. Depending on its determination of the phase of the signal from the amplifier 28, the phase detector 30 transmits a signal to the D.C. amplifier 40 and the signal from the amplifier 40 modulates the voltage of the oscillator 42 corresponding to the phase of the signal from the amplifier 28. The output of the D.C. amplifier 32 is imposed on the oscillator 42 which increases or decreases the voltage supplied to the power amplifier 44, thereby increasing or decreasing the intensity of the lamp 2.

There are several important advantages in using 190 to 200 cycles per second for the electrostatic chopper. Since the monitor circuit is very sensitive, it would be difficult to distinguish between the signal from the amplifier and from stray pickup, if all of the components were operated on 60 cycles. Some equipment is particularly well adapted to 60-cycle current. For example, it is advantageous to use 60-cycle current in servo motor circuits, such as are described above for the utilization circuit. If the lamp regulator were also regulated at 60 cycles, it would be necessary to use numerous filters to attempt to filter out stray 60-cycle signals. Since the oscillator operates at 190 cycles per second, the A.C. signal of the amplifier 28 is distinguishable from line frequency and from stray pickup from servo motor and other circuits. The higher frequency also produces a shorter time constant in the phase detection circuit and accordingly, a quicker response.

While the invention has been illustrated and described in one embodiment, it is recognized that variations and changes may be made therein, without departing from the invention as set forth in the claims.

I claim:
1. A system for regulating the intensity of a light source at a preselected value comprising a power supply for the light source, a phototube, means for mounting the phototube exposed to the light source, means for supplying a direct current potential to the phototube, a capacitive chopper for converting the direct current output of the phototube to an alternating current, means for detecting the phase of the current from the chopper, and means responsive to the phase of the output of the chopper for applying a corrective signal to the power supply to regulate the intensity of light from the light source.

2. A system for regulating the intensity of a light source at a preselected value comprising a power supply for the light source, a phototube, means for mounting the phototube exposed to the light source, means for supplying a direct current potential to the phototube, a capacitive chopper for converting the direct current output of the phototube to an alternating current, an oscillator for supplying a constant frequency current, means connecting the chopper to the oscillator to drive the chopper at the oscillator frequency, means for amplifying the output of the chopper, a phase detector coupled to the oscillator and to the amplifier for detecting the phase of the output of the chopper with respect to the phase of the output of the oscillator and means responsive to the relative phases for applying a corrective signal to the power supply for the light source.

3. A system for regulating the intensity of a light source at a preselected value comprising a power supply for the light source, a phototube, means for mounting the phototube exposed to the light source, means for supplying a direct current potential to the phototube, a capacitive chopper for converting the direct current output of the phototube to an alternating current, an oscillator for supplying a current at a constant frequency which is different from frequencies present in other components of the system, means connecting the chopper to the oscillator to drive the chopper at the oscillator frequency, means for amplifying the output of the chopper, a phase detector coupled to the oscillator and to the amplifier for detecting the phase of the output of the chopper with respect to the phase of the output of the oscillator and means responsive to the relative phases for applying a corrective signal to the power supply for the light source.

4. In combination, a utilization circuit operating in response to the optical qualities of an article in the path of light from a light source, a system for regulating the intensity of the light source comprising a power supply for the light source, a phototube, means for mounting the phototube in the path of light from the light source, means for supplying a direct current potential to the phototube, means for balancing the current generated by the phototube, a capacitive chopper in the balancing means, an oscillator for supplying current the frequency of which is different from frequencies used in the utilization circuit and other components of the regulator circuit, means for connecting the chopper to the oscillator to drive the chopper at the oscillator frequency, a phase detector coupled to the oscillator and to the chopper for detecting the phase of the output signal of the chopper with respect to the output of the oscillator and means responsive to the relative phases for applying a corrective signal to the power supply for the light source.

References Cited by the Examiner

UNITED STATES PATENTS

| | | | |
|---|---|---|---|
| 2,055,591 | 9/36 | Rau | 331—58 |
| 2,938,118 | 5/60 | Martin | 250—43.5 |
| 2,948,814 | 8/60 | Rich | 250—205 |
| 2,982,859 | 5/61 | Steinbrecher | 250—205 |
| 3,002,099 | 9/61 | Gregory | 250—205 |

FOREIGN PATENTS

| | | |
|---|---|---|
| 1,088,154 | 9/60 | Germany. |
| 719,899 | 12/54 | Great Britain. |

RALPH G. NILSON, *Primary Examiner.*

WALTER STOLWEIN, *Examiner.*